UNITED STATES PATENT OFFICE.

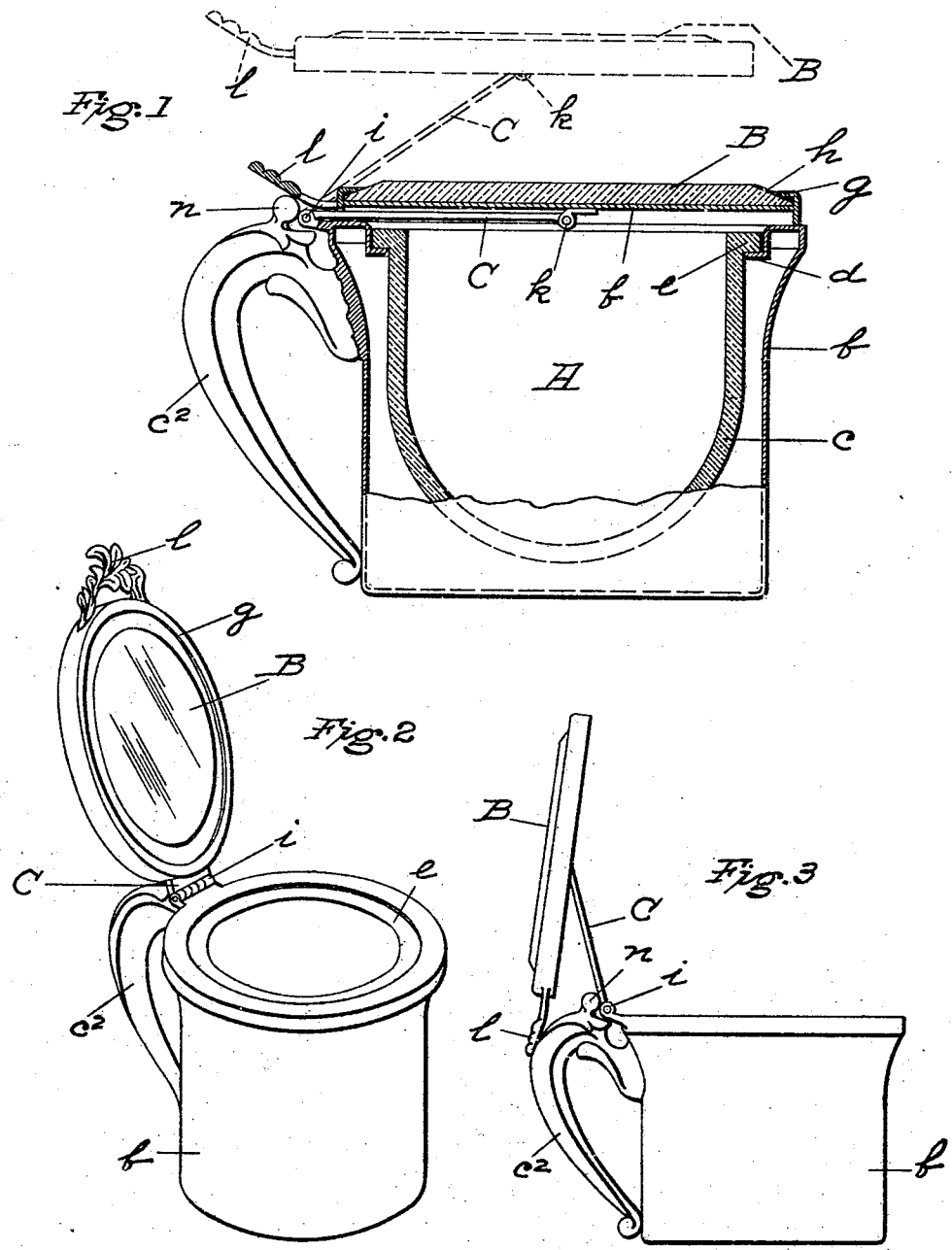

JOHN C. DOWD, OF NEW YORK, N. Y.

SHAVING-MUG.

946,937.  Specification of Letters Patent.  Patented Jan. 18, 1910.

Application filed April 22, 1909. Serial No. 491,573.

*To all whom it may concern:*

Be it known that I, JOHN C. DOWD, a citizen of the United States, residing in the city of New York, borough of Manhattan, county and State of New York, have invented a certain new and useful Shaving-Mug, of which the following is a specification.

This invention is a shaving mug embodying a mirror, mounted in a particular way, as one of the elements thereof, in order that the user of the mug may at all times have a mirror at his disposal for shaving or other purposes. This result is accomplished by mounting a mirror in such a way that it normally serves as a cover to the mug, but, when required for use, may be swung or tilted into such position as desired to render its use convenient.

Since the mirror forms an element of construction of the cup, it does not materially increase the cost thereof, or complicate its structure, or increase its weight, and while adapted for use as a shaving mug generally, it has proved of special value to travelers.

In the accompanying drawings I have illustrated one practical embodiment of the invention, but the construction shown therein is to be understood as illustrative, only, and not as defining the limits of the invention.

Figure 1 is a cross sectional elevation of the novel mug showing the mirror or cover, in full lines, in closed position, and, in dotted lines, in one of the positions it takes when tilting it to a position for use as a mirror; Fig. 2 is a perspective view of the open mug showing the mirror tilted back into operative position, but with the mirrored surface facing the mug; and Fig. 3 shows the open mug in vertical elevation, but with the mirrored surface facing rearwardly of the mug.

In the embodiment of the invention shown, a mug, cylindrical in shape, and provided with a separable soap container is illustrated, A representing the mug, as a whole, $b$ the outer container, preferably of metal, $c$ the removable soap container, composed, preferably, of non-corrosive material, such as glass or porcelain, and $c^2$ the handle to the mug.

The inner and upper part of the outer container is provided with an inwardly extending flange, $d$, which forms a seat or support for the soap container, the upper part of which has an outwardly extending flange, $e$, adapted to rest on flange, $d$.

The cover of the mug is composed of a flat metal backing, $f$, forming a seat or support for the mirror, B, and which is secured thereto by a circumferential flange, $g$, on the metal backing, said flange overlapping the beveled edge, $h$, of mirror, B, thereby retaining it securely in place.

For attaching the cover to the cup, as well as providing means for tilting the mirror into the position desired for use, I employ an arm or link, C, one end of which is pivoted to the outer container of the mug, as at $i$, and the other end of which is pivoted centrally to the metal backing, $f$, of the cover, as at $k$. It will be observed, therefore, that the cover and mirror are supported, when in open position by link, C, and not directly by the receptacle. The pivotal connection, $k$, in practice, will be of the friction type in order that the mirror will be held in any tilted position in which it may be placed.

Extending from the cover is a lip or flange, $l$, which serves as a stop when the mirror is tilted into the position shown in Fig. 3, and, also, normally serves as a means for manipulating the cover.

The handle, $c^2$, of the mug is provided, near its top, with an upwardly projecting member, $n$, which serves as a stop or rest for the link which supports the cover when the mirror occupies the position shown in Fig. 2.

It will be observed that while the link mechanism permits of the mirror being tilted into various positions, that when the cover is closed the link is concealed thereby, and, furthermore, this construction presents many advantages over one where the cover is directly pivoted to the receptacle. When the cover is tilted into the position shown in Fig. 3, it will not become blurred by vapor, powder, or other material which might escape from the receptacle.

While I have shown the invention as embodied in a shaving mug, it will be obvious that it may be applied to other containers, such as powder and puff receptacles, etc., and, moreover, that changes may be made in the specific construction described within the scope of the appended claims, such as the substitution of equivalents, without departing from the spirit of the invention.

Having thus fully described the invention, what I claim as new, and desire to secure by Letters Patent is:

1. In a device of the class described, a receptacle, a cover therefor provided with a mirror which is normally exposed when the cover occupies a closed position, and a cover supporting link one end of which is pivoted to the receptacle and the other end to the cover and at the lower side thereof so that when the cover is in a closed position said link is concealed.

2. In a device of the class described, a receptacle, a link having one of its ends pivotally secured thereto, a cover for said receptacle having a normally exposed mirrored surface when said cover occupies a closed position, the cover being pivotally connected by a friction joint to the other end of said link whereby the cover may be raised from the receptacle and the mirrored surface thereon tilted and secured in various positions.

3. In a device of the class described, a receptacle, a link having one of its ends pivotally secured thereto, a cover for said receptacle having a normally exposed mirrored surface when said cover occupies a closed position, said cover being pivotally connected to the other end of said link and a stop on the receptacle forming a rest for the link.

4. In a device of the class described, a receptacle, a cover therefor on the normally exposed surface of which is a mirror, and a cover supporting link one end of which is pivoted to the receptacle and the other pivoted to the bottom of the cover whereby said cover may be raised from the receptacle and supported by said link.

5. In a device of the class described, a receptacle, a cover therefor on the normally exposed surface of which is a mirror, a cover supporting link one end of which is pivoted to the receptacle and the other pivoted to the bottom of the cover whereby said cover may be raised from the receptacle and supported by said link and a stop on the receptacle for said link.

6. In a device of the class described, a receptacle, a cover therefor on the normally exposed surface of which is a mirror, a cover supporting link one end of which is pivoted to the receptacle and the other pivoted to the bottom of the cover whereby said cover may be raised from the receptacle and supported by said link, an extension flange on the cover and a stop with which said flange is adapted to engage when the cover is tilted into a position facing away from the receptacle.

In testimony whereof I have signed my name to this specification in the presence of two subscribing witnesses.

JOHN C. DOWD.

Witnesses:
ROBERT B. FRANKLIN,
IRENE SCHMIDT.